March 27, 1945.                 C. B. COOK                 2,372,357
                          HYDRAULIC TRANSMISSION
               Filed Feb. 23, 1943                    2 Sheets-Sheet 1
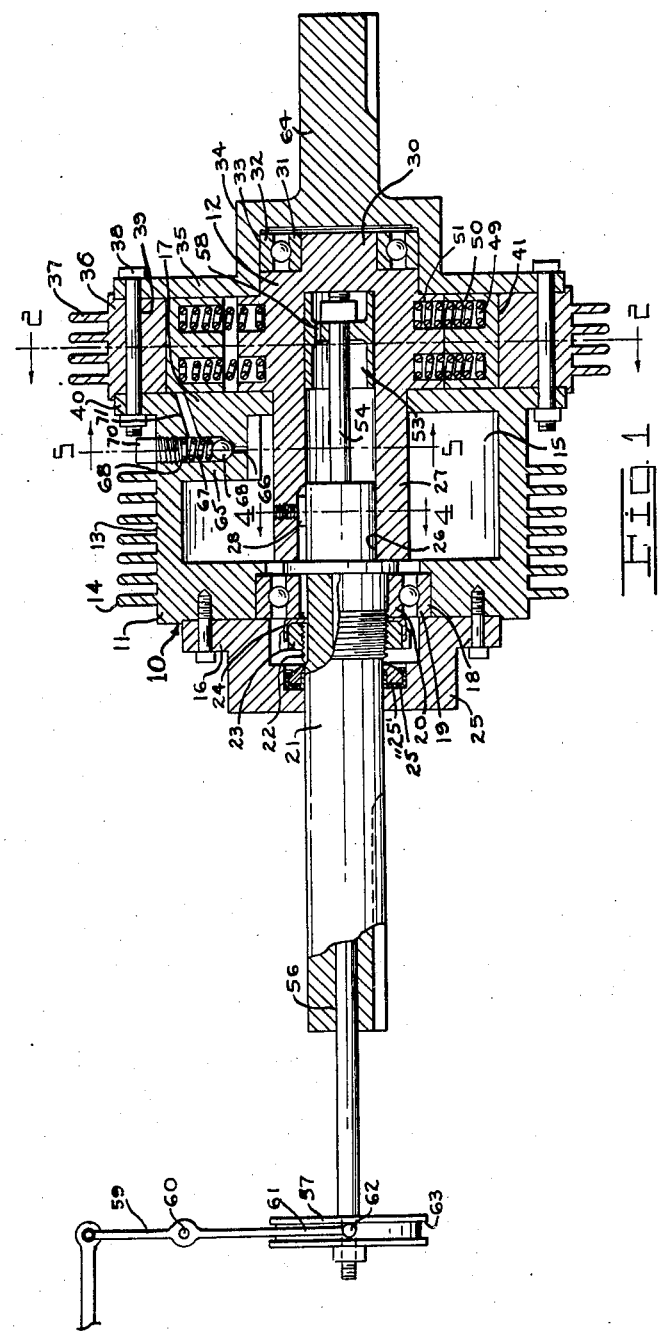
INVENTOR.
C. B. COOK
BY
ATTORNEY March 27, 1945.  C. B. COOK  2,372,357
HYDRAULIC TRANSMISSION
Filed Feb. 23, 1943   2 Sheets-Sheet 2
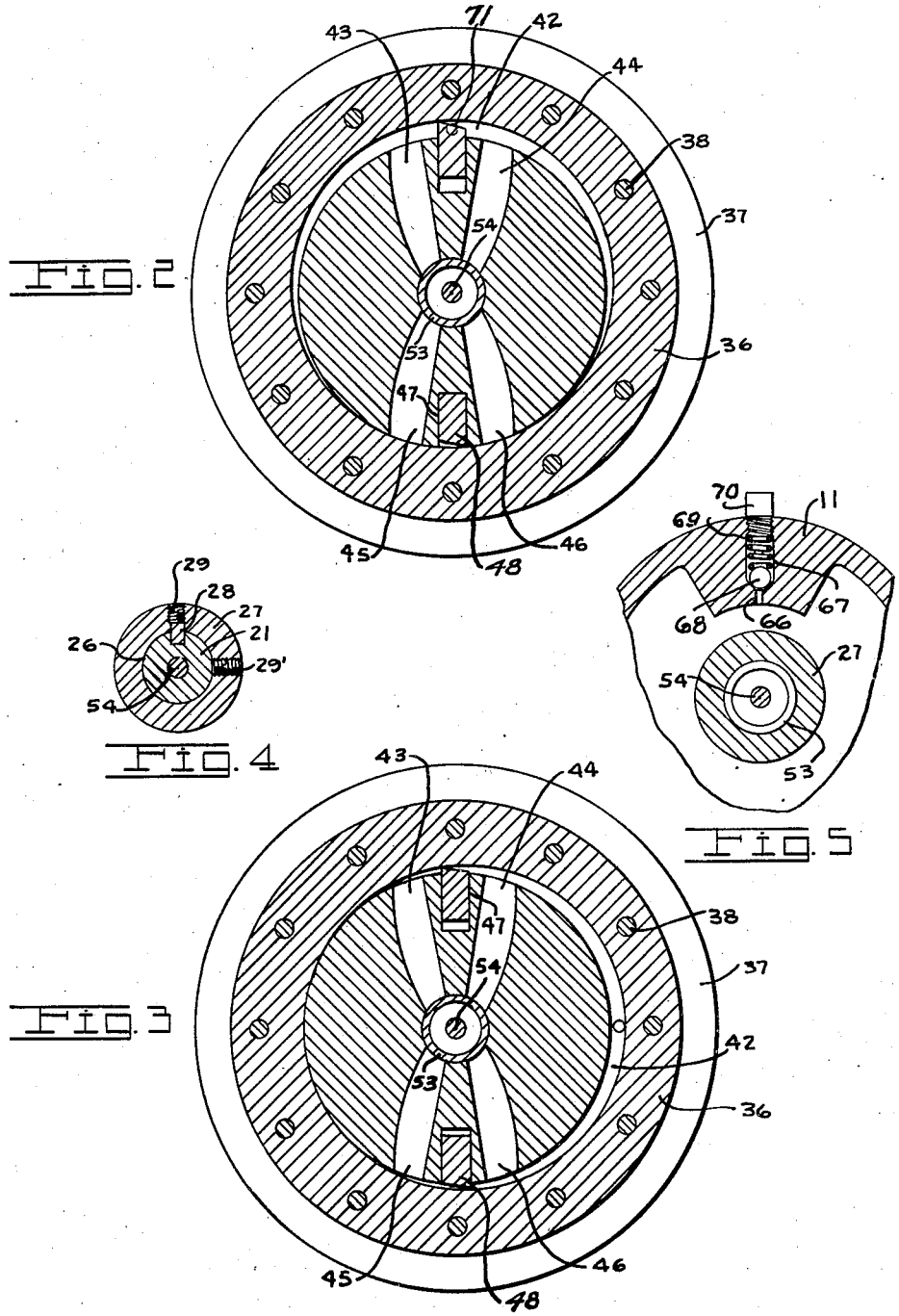
INVENTOR.
C. B. COOK
BY
ATTORNEY Patented Mar. 27, 1945

2,372,357

UNITED STATES PATENT OFFICE 2,372,357

HYDRAULIC TRANSMISSION

Charles B. Cook, Los Angeles, Calif.

Application February 23, 1943, Serial No. 476,875

1 Claim. (Cl. 192—58)

This invention relates to a hydraulic transmission.

The general object of my invention is to provide a novel pair of coacting fluid controlled members including a driven member and a driving member with novel means to cause operation thereof.

A further object of my invention is to provide a transmission including a novel means for replacing fluid which leaks from the rotor chamber during operation of the transmission.

A further object of my invention is to provide a fluid device including members providing a working circuit for fluid with a well or reservoir associated with one of the members and with a passage for fluid from the well to the circuit thus maintaining an efficient quantity of fluid in the circuit.

An additional object of my invention is to provide a hydraulic transmission including members providing a working circuit for fluid with a reservoir communicating with the circuit and with a valved conduit to cause fluid to pass from the reservoir to the circuit in the expansion cycle.

Other objects and advantages of my invention will be apparent from the following description taken in connection with the accompanying drawings wherein:

Fig. 1 is a central, sectional, longitudinal, view showing a hydraulic transmission embodying the features of my invention;

Fig. 2 is a section taken on line 2—2, Fig. 1;

Fig. 3 is a view similar to view 2 with the parts in another position;

Fig. 4 is a section taken on line 4—4, Fig. 1, and

Fig. 5 is a fragmentary section taken on line 5—5, Fig. 1.

Referring to the drawings by reference characters I have shown my invention as embodied in a hydraulic transmission which is indicated generally at 10. As shown the device includes a cylindrical casing 11 and a rotor 12.

The cylindrical casing includes a generally cylindrical outer surface 13 which may have cooling vanes 14 thereon. The casing is provided with a well 15 and with a rear wall 16 and a front wall 17. The rear wall 16 is rabbeted at 18 to receive the outer member 19 of a ball race. The inner member 20 of the ball race engages a shaft 21 which is threaded as at 22 to receive a threaded bearing retainer 23 which holds a retainer ring 24 against the bearing member 20. A cap 25 surrounds the bearing and has a recess 25' which receives the shaft 21.

The inner end of the shaft 21 fits in a bore 26 on a collar 27 which is integral with the rotor. The shaft 21 and the collar 27 are keyed together by a key 28 which is held in place by a set screw 29 (Fig. 4). A key 29' prevents longitudinal movement between the collar 27 and the shaft 21.

At its front end the rotor 12 is provided with a boss 30 on which the inner member 31 of a ball race is mounted. The outer race member 32 fits in a recess 33 on a hub 34 on a coverplate 35.

Between the coverplate 35 and the end 17 of the body I provide a cylindrical rotor housing 36 which has cooling vanes 37 on the outer periphery thereof. Bolts 38 pass through aligned apertures 39 in the closure 35, the rotor housing 36 and a flange 40 on the casing 11. The rotor housing 36 is provided with a cylindrical chamber 41 the axis of which is eccentric to the axis of the shaft 21 and to the axis of the casing 11. As a result a crescent shaped cavity 42 is provided in which the rotor revolves relative to the casing.

The rotor is provided with spaced slots 43, 44, 45 and 46 which are arranged in diametrically opposed pairs. Between each pair of slots I arrange inwardly extending notches 47 in which vane members 48 are slidably mounted. These vane members are normally urged outwardly into engagement with the outer wall of the chamber 42 by springs 49. The springs 49 fit in recesses 50 in the vane members and in recesses 51 in the rotor.

The slots 43, 44, 45 and 46 extend inwardly and intersect the bore 26. A valve member 53 slides in the bore 26 and when moved inwardly closes the inner ends of the slots 43, 44, 45 and 46. The valve member is in the nature of a piston having piston rod 54 secured thereto. The piston rod extends through a bore 56 in the shaft 21 and has a shifting member 57 secured thereto. The piston includes a bleed aperture 58.

The piston is adapted to be moved by a shifting member 59 pivoted at 60 and having a yoke 61 thereon. The yoke 61 has pins 62 which fit in a slot 63 in the member 57. Rocking of the member 59 about its pivot 60 will move the valve so that the flow of fluid through the slots 43, 44, 45 and 46 will be controlled.

I arrange a suitable fluid packing member 25" in the recess 25' to prevent leakage along the shaft 21. The hub member 34 is provided with a shaft 64 which is coaxial with the shaft 21. I prefer to employ the shaft 64 as the drive shaft, although the arrangement may be otherwise.

Within the well 15 I arrange a box 65 which has a port 66 communicating with the well 15. The port 66 communicates with a valve recess 67 which receives a ball valve 68 engaging the upper end of the port 66. The valve 68 is held normally closed by a spring 69 which is engaged by a screw plug 70. A channel 71 extends from the recess 67 and opens into the chamber 41. This channel 71 enters the chamber 41 at the location of greatest eccentricity of the chamber.

The port 66, valve recess 67 and channel 71 constitute a conduit which permits flow of fluid from the well 15 to the chamber 41 but prevents flow in a reverse direction.

In the operation of my device when the shaft 64 is driven the casing is rotated and the fluid, such as oil, within the chamber 41 is held in this chamber and in the slots 43, 44, 45 and 46 so long as the valve 53 closes the inner ends of these slots. Thus the rotor is turned at the same speed as that of the shaft 64 except for the slight slippage due to leaks through the various engaging portions. When the valve 53 is moved outwardly and the slots 43, 44, 45 and 46 are opened fluid passes from the slots on the high pressure side, across the valve, and to the corresponding slot on the low pressure side and thus the rotor is turned at a speed less than the speed of the casing, the ratio of the speed being controlled by the amount the valve 53 is opened.

During this operation, due to tolerances, some fluid in the chamber 41 and slots 43, etc., will leak into the well 15. The well 15 is initially filled almost, but preferably not completely filled. In operation the amount of fluid in the well 15 is increased by the leakage from the high pressure side of the chamber 41.

To supply fluid to take care of this leakage I provide the conduit which in the disclosure consists of the port 66, recess 67, and channel 71. The fluid in the well 15 flows through this conduit being drawn into the chamber 42 during the suction or low pressure phase. In Fig. 2 the channel 71 is in neutral position. As the rotor housing 36 rotates clockwise relative to the rotor 12 the channel 71 is opened and at the same time the volume at that location of the chamber is increasing.

This causes fluid to be drawn from the well 15 and also at the same time oil passes through the slot 44 to the chamber 42. Without my improved conduit the amount of fluid which passes through the slot 44 (and the other slots under similar conditions) would not be quite sufficient to fill the chamber and thus inefficient operation would result. With my construction the working circuit is kept completely filled during operation, so that efficient operation is secured.

From the foregoing description it will be apparent that I have invented a novel hydraulic transmission which can be economically manufactured and which is highly efficient for its intended purpose.

Having thus described my invention, I claim:

A hydraulic transmission device including a casing having a cylindrical outer wall and having a well therein, said casing having a rear wall and a front wall, said rear wall having a bore, a shaft extending through said bore, said front wall having a bore, a rotor in advance of the front wall of the casing, said rotor having a collar extending through said front wall bore, said collar having a bore receiving said shaft, means preventing movement between the collar and shaft, a cylindrical rotor housing arranged about said rotor and engaging said casing front wall, said rotor comprising a cylindrical body mounted coaxial with the casing, said rotor housing having a cylindrical chamber arranged eccentric to the axis of the casing so that a crescent shaped cavity is provided in which the rotor revolves relative to the casing, said rotor body having diametrically arranged pairs of spaced slots therein, said rotor having a central bore, said slots extending inward and intersecting the bore in said rotor, said rotor having a movable vane member disposed between each pair of slots, means normally urging the vane members towards the housing wall, said casing having a conduit between said chamber and said well, a one-way valve in said conduit arranged to permit passage of fluid from the chamber to the well, a piston valve slidable in said rotor bore and movable to control flow of fluid through said slots, said shaft having a bore therethrough, a piston rod on said piston and extending through said shaft bore, said piston rod being shiftable to move said piston valve, a cover plate on said rotor housing, and a shaft on said cover plate and coaxial with said first shaft.

CHARLES B. COOK.